(12) United States Patent
Yamaguchi (10) Patent No.: US 8,235,474 B2
(45) Date of Patent: Aug. 7, 2012

(54) ELECTRIC DISK BRAKE

(75) Inventor: Tohma Yamaguchi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1048 days.

(21) Appl. No.: 12/219,423

(22) Filed: Jul. 22, 2008

(65) Prior Publication Data

US 2009/0032342 A1 Feb. 5, 2009

(30) Foreign Application Priority Data

Jul. 31, 2007 (JP) .................. 2007-199537

(51) Int. Cl.
*F16D 66/00* (2006.01)
(52) U.S. Cl. ................. 303/191; 188/1.11 L; 188/1.11 E
(58) Field of Classification Search ............. 188/1.11 L, 188/1.11 E, 71.9, 72.8, 162; 303/191
See application file for complete search history.

(56) References Cited

U.S. PATENT DOCUMENTS

| | | | |
|---|---|---|---|
| 6,209,689 B1 * | 4/2001 | Bohm .......................... 188/156 |
| 6,250,436 B1 * | 6/2001 | Oikawa et al. ............... 188/72.1 |
| 6,969,126 B2 * | 11/2005 | Ichinose et al. ................. 303/11 |
| 7,467,692 B2 * | 12/2008 | Ether ....................... 188/1.11 E |
| 2002/0063022 A1 * | 5/2002 | Shaw et al. ................... 188/72.1 |
| 2004/0104618 A1 * | 6/2004 | Yamamoto et al. ............. 303/20 |
| 2009/0183958 A1 * | 7/2009 | Sano et al. ................. 188/204 R |
| 2009/0184573 A1 * | 7/2009 | Nakajima ..................... 303/155 |

FOREIGN PATENT DOCUMENTS

| | | |
|---|---|---|
| JP | 2001-32868 | 2/2001 |
| JP | 2001-343036 | 12/2001 |
| JP | 2002-213507 | 7/2002 |
| JP | 2003-202042 | 7/2003 |

OTHER PUBLICATIONS

Japanese Office Action (with English translation) issued Dec. 14, 2012 in corresponding Japanese Patent Application No. 2007-199537.

* cited by examiner

*Primary Examiner* — Bradley King
(74) *Attorney, Agent, or Firm* — Wenderoth, Lind & Ponack, LLP

(57) ABSTRACT

An electric disk brake that prevents uneven abrasion of a disk rotor when the brake is not in operation. Rotation of an electric motor is slowed down by a differential speed reducing mechanism, and is converted to linear motion of a piston by a ball ramp mechanism. When the brake is not in operation, the piston is retracted by reverse rotation of the electric motor so that a predetermined pad clearance is maintained. When the brake is not in operation, a pad-retracting-control electric current is supplied to the electric motor so that the piston is biased backward while being maintained in one position. When the brake is not in operation, contact of the disk rotor with the brake pads due to runout of the disk rotor triggers smooth retracting of the piston, thereby preventing uneven abrasion of the disk rotor.

13 Claims, 10 Drawing Sheets

ELECTRIC DISK BRAKE

BACKGROUND OF THE INVENTION

1. Technical Field

The present invention relates to an electric disk brake which generates a brake force by pressing a brake pad to a disk rotor by use of an electric motor.

2. Description of the Related Art

As an electric disk brake, for example, Japanese Patent Public Disclosure 2003-202042 discloses an electric disk brake in which a rotational movement of a rotor of an electric motor is converted into a linear movement of a piston by use of a rotation-linear motion converting mechanism such as a ball screw mechanism or a ball ramp mechanism, and brake pads are pressed against a disk rotor by the piston, thereby generating a brake force. In the electric disk brake, a force of a driver's pressing a brake pedal (or displacement amount) is detected by a sensor, and rotation of the electric motor is controlled by a controller based on the detected value, whereby a desired brake force can be generated.

In this kind of electric disk brake, control accuracy can be improved by appropriate controlling of a brake force based on a thrust force of the piston or a rotational position of the electric motor. In addition, when the brake is not in operation, constant pad clearances can be maintained between the disk rotor and the brake pads based on the rotational position of the electric motor.

However, in the above-mentioned conventional electric disk brake, maintaining the constant pad clearances based on the rotational position of the electric motor may cause an undesirable effect as follows; for example, if runout of the disk rotor occurs due to, for instance, thermal deformation caused by a braking operation immediately after the end of the braking operation, the disk rotor may irregularly contact brake pads positioned in respective positions when the brake is not in operation. This contact occurs because small pad clearances are set to quickly perform a brake operation. At this time, in the above-mentioned electric disk brake, even though the disk rotor tries to retract the piston by contacting the brake pads, a position control is performed such that the electric motor is rotated so as to maintain the brake pads in the respective positions when the brake is not in operation. Consequently, the brake pads are pressed against the disk rotor, and the disk rotor tends to be unevenly abraded (or unevenly worn) to become ripply along a rotational direction. With the disk rotor unevenly abraded, brake judder is likely to occur.

SUMMARY OF THE INVENTION

The present invention has been contrived in consideration of this circumstance, and an object thereof is to provide an electric disk brake enabling prevention of uneven abrasion of a disk rotor.

To achieve the foregoing and other objects, an aspect of the present invention is an electric disk brake, comprising:
an electric motor;
a rotation-linear motion converting mechanism for converting a rotational movement of the electric motor into a linear movement;
a pad pressing member for pressing a brake pad against a disk rotor by the linear movement of the rotation-linear motion converting mechanism; and
a controller for, when the brake is in operation, supplying an electric current to the electric motor so as to generate a target thrust force of the pad pressing member, the controller which, when the brake is not in operation, causes the pad pressing member to operate such that a constant clearance is maintained between the brake pad and the disk rotor, and allows retracting of the pad pressing member when the disk rotor contacts the brake pad.

Another aspect of the present invention is an electric disk brake, comprising:
an electric motor;
a rotation-linear motion converting mechanism for converting a rotational movement of the electric motor into a linear movement;
a pad pressing member for pressing a brake pad against a disk rotor by the linear movement of the rotation-linear motion converting mechanism; and
a controller for, when the brake is in operation, supplying an electric current to the electric motor so as to generate a target thrust force of the pad pressing member,
wherein the pad pressing member, after returning to a predetermined position, is maintained in the position even though the controller stops supplying an electric current to the electric motor; and
when the brake is not in operation, the controller supplies a predetermined pad-retracting-control electric current to the electric motor so that the pad pressing member is biased backward while being maintained in the position, whereby
when the disk rotor contacts the brake pad, retracting of the brake pad is initiated, and
when the disk rotor does not contact the brake pad, the position of the brake pad is maintained.

The pad-retracting-control electric current may be an electric current having an appropriate value to allow the brake pad to be maintained in a position to which the brake pad has retracted, after the brake pad has retracted due to contact of the disk rotor to the brake pad, when the brake is not in operation.

The controller may control the electric motor such that, when the brake is not in operation, after the pad pressing member has retracted due to contact of the disk rotor to the brake pad, the pad pressing member further retracts by a predetermined distance from a position to which the pad pressing member has retracted.

Still another aspect of the present invention is an electric disk brake, comprising:
an electric motor;
a rotation-linear motion converting mechanism for converting a rotational movement of the electric motor into a linear movement;
a pad pressing member for pressing a brake pad against a disk rotor by the linear movement of the rotation-linear motion converting mechanism;
a position detector for detecting a rotational position of the electric motor; and
a controller for supplying an electric current to the electric motor so as to generate a target thrust force of the pad pressing member,
the controller, when the brake is not in operation, returning the pad pressing member to a predetermined position and maintaining the pad pressing member in the position, and supplying to the electric motor a pad-retracting-control electric current that is a lowest electric current allowing the pad pressing member to be maintained in the predetermined position.

When the brake is not in operation, the controller, after returning the pad pressing member to the predetermined position based on a detection result of the position detector, may supply the pad-retracting-control electric current to the electric motor so that the pad pressing member is maintained in the predetermined position.

The controller may control the electric motor such that, when the brake is not in operation, after the pad pressing member has retracted due to contact of the disk rotor to the brake pad, the pad pressing member further retracts by a predetermined distance from a position to which the pad pressing member has retracted.

The pad pressing member may be constantly urged backward by a urging unit.

The controller may stop supplying the pad-retracting-control electric current to the electric motor when a vehicle is turning.

The controller may stop supplying the pad-retracting-control electric current to the electric motor when a vehicle is running on a rough surface.

DETAILED DESCRIPTION OF THE PREFERRED EMBODIMENTS

Hereinbelow, an embodiment of the present invention will be described in detail with reference to the accompanying drawings.

Figure 2:
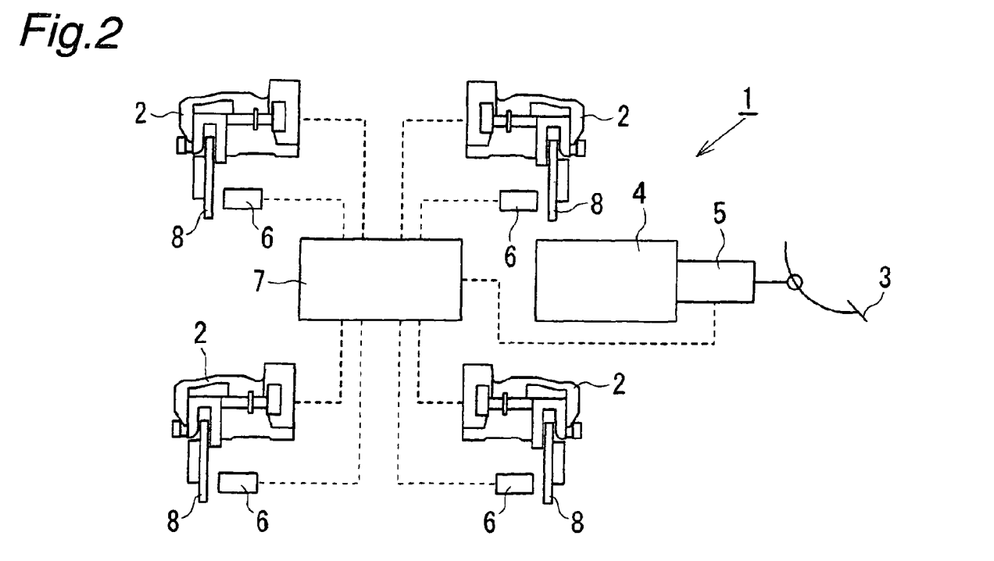
FIG. 2 schematically illustrates a structure of the electric disk brake according to the embodiment of the present invention.

FIG. 2 schematically illustrates a structure of an electric disk brake of an embodiment of the present invention. As shown in FIG. 2, an electric disk brake 1 comprises an electric disk brake main body 2 mounted on each of wheels of a vehicle, a stroke simulator 4 coupled with a brake pedal 3, a stroke sensor 5 which detects an operation stroke of the brake pedal 3 carried out by a driver, and a controller 7 (controlling means) which supplies a controlling electric current to the electric disk brake main body 2 based on detection results of various sensors such as the stroke sensor 5 and a vehicle speed sensor 6.

Figure 1:
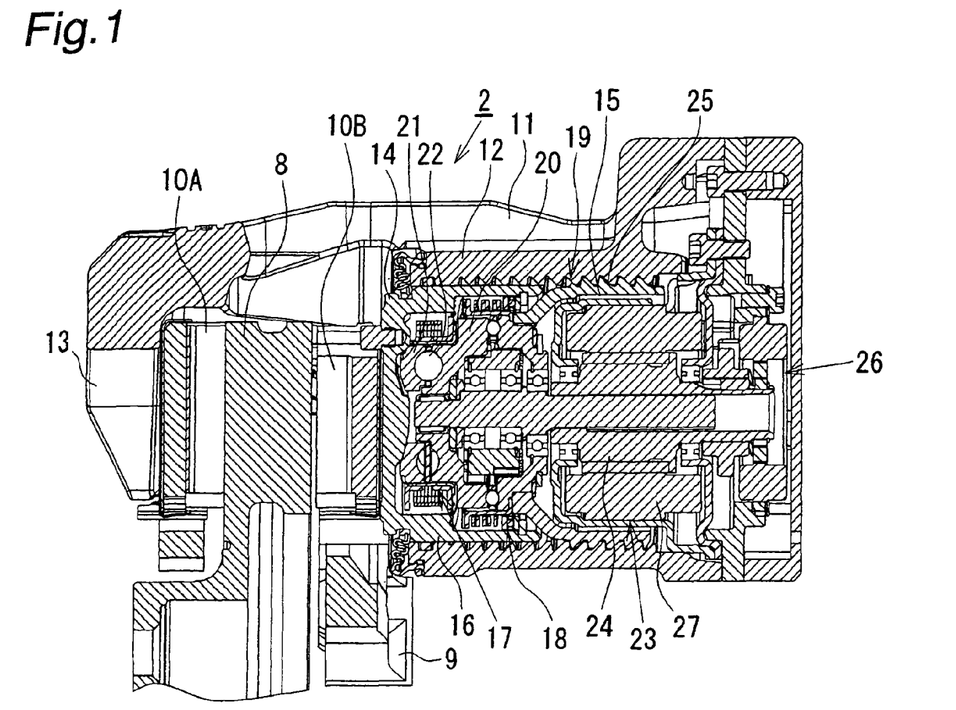
FIG. 1 is a vertical cross-sectional view of an electric disk brake according to an embodiment of the present invention.

As shown in FIG. 1, the electric disk brake main body 2 is embodied as a floating caliper type disk brake. The main body 2 comprises a carrier 9, a pair of brake pads 10A and 10B, and caliper main body 11. The carrier 9 is fixed to a non-rotating portion (not shown) of a vehicle body side, such as a suspension member. The pair of brake pads 10A and 10B are disposed on respective sides of a disk rotor 8 which rotates together with the wheel, and are supported by the carrier 9. The caliper main body 11 is disposed so as to extend over or straddle the disk rotor 8, and is supported so as to be movable along an axis of the disk rotor 8 relative to the carrier 9.

A cylindrical cylinder portion 12 and a claw portion 13 are integrally formed with the caliper main body 11. The cylinder portion 12 includes a through-hole open to one side of the disk rotor 8. The claw portion 13 extends from the cylinder portion 12 to the opposite side of the disk rotor 8 so as to straddle the disk rotor 8. A piston unit 14 and a motor unit 15 are disposed in the cylinder portion 12 of the caliper main body 11.

The piston unit 14 is formed by integrally assembling a bottomed cylindrical piston 16 (pad pressing member), a ball ramp mechanism 17 (rotation-linear motion converting mechanism), a differential speed reducing mechanism 18, and a pad abrasion compensating mechanism 19. The piston 16 is slidably fitted in the cylinder portion 12, and contains the mechanisms 17 and 18 inside thereof. The ball ramp mechanism 17 comprises a rotation disk 20, a linear motion disk 21, and balls 22 (steel balls) disposed in an inclined groove between the rotation disk 20 and the linear motion disk 21. A relative rotation between the rotation disk 20 and the linear motion disk 21 causes a rolling motion of each of the balls 22 in the inclined groove, which in turn causes an axial relative displacement between the rotation disk 20 and the linear motion disk 21 according to a rotation angle between the disks 20 and 21. In this way, a rotational movement is converted to a linear movement. In the illustrated embodiment, the rotation-linear motion converting mechanism is embodied by the ball ramp mechanism 17, although it may be embodied by, for example, a ball screw mechanism, a roller ramp mechanism, or a precision roller screw mechanism.

The differential speed reducing mechanism 18 is interposed between the ball ramp mechanism 17 and an electric motor 23 of the motor unit 15. The mechanism 18 is adapted to reduce a rotation speed of a rotor 24 of the electric motor 23 according to a predetermined speed reducing ratio, and then transmit the slowed-down rotation to the rotation disk 20 of the ball ramp mechanism 17. The pad abrasion compensating mechanism 19 is adapted to advance an adjusting screw 25 to cause an advance of the ball ramp mechanism, when the brake pads 10A and 10B are abraded (or contact positions of the pads with the disk rotor 8 are changed).

The motor unit 15 comprises the electric motor 23 and a resolver 26 (position detector) built therein. Application of an electric current to a coil of a stator 27 of the electric motor 23 causes the rotor 24 to rotate, whereby the ball ramp mechanism 17 is driven through the differential speed reducing mechanism 18. At this time, a rotational position of the rotor 24 is detected by the resolver 26.

The electric disk brake main body 2 works as follows.

When the stroke sensor 5 detects an operation of the brake pedal 3 carried out by a driver, the controller 7 supplies a controlling electric current to the electric motor 23 according to the detection result of the sensor 5, thereby causing a rotation of the rotor 24. The rotation of the rotor 24 is slowed down by the differential speed reducing mechanism 18 at the predetermined speed reducing ratio, and is converted to a linear motion by the ball ramp mechanism 17, and the piston 16 is advanced by the converted linear motion. In response to the advance of the piston 16, the brake pad 10B or one of the brake pad pair is pressed against the disk rotor 8. A reactive force generated by this pressing displaces the caliper main body 11, causing the claw portion 13 to press the brake pad 10A or the other of the brake pad pair against the disk rotor 8, whereby a brake force is generated. Abrasion of the brake pads 10A and 10B is compensated by the pad abrasion compensating mechanism 19, in which the adjusting screw 25 of the mechanism 19 advances to push forward the ball ramp mechanism 17 by a distance corresponding to an abrasion amount.

Furthermore, the controller 7 detects a vehicle condition such as a rotation speed of each wheel, a vehicle speed, a vehicle acceleration, a steering angle and a lateral acceleration of the vehicle, with use of various sensors such as the vehicle speed sensor 6. Then, the controller 7 controls a rotation of the electric motor 23 based on the detection results, whereby boost control, anti-lock control, traction control, vehicle stabilizing control and the like can be performed.

Figure 7:
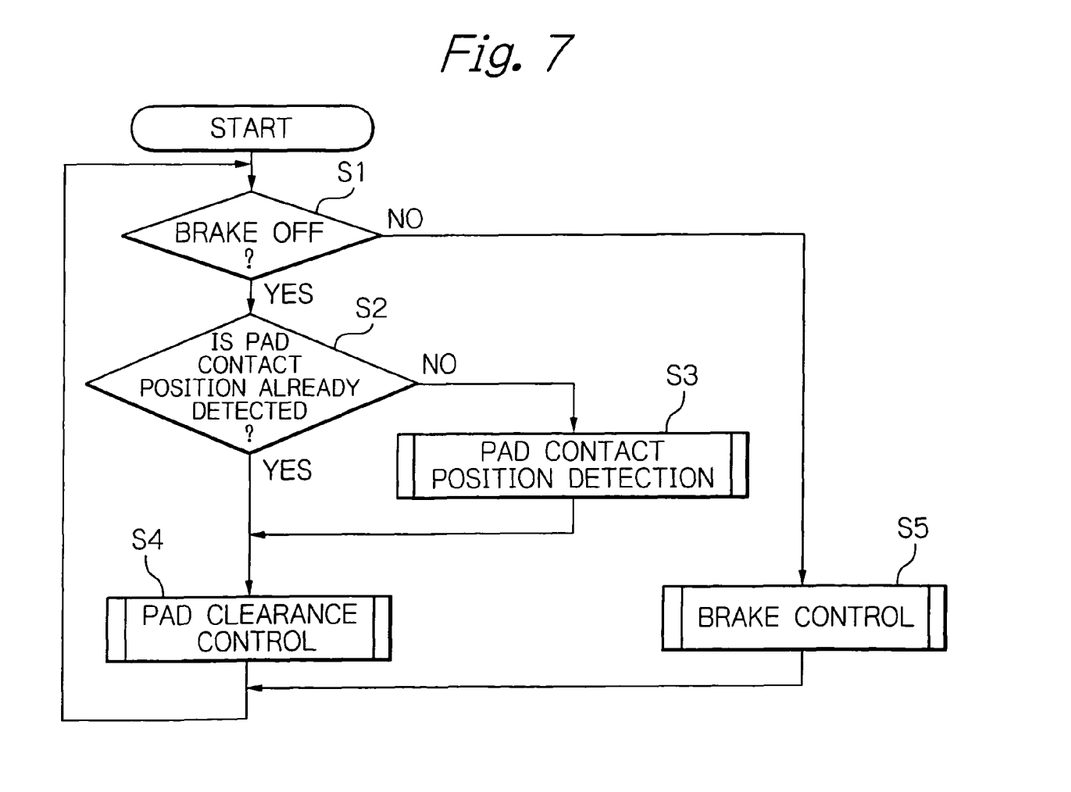
FIG. 7 is a flow chart of control performed by a controller of the electric disk brake shown in FIG. 2.

FIG. 7 illustrates how the controller 7 controls the electric disk brake main body 2.

Referring to FIG. 7, it is determined at step S1 whether the brake pedal 3 is operated. If the brake pedal 3 is operated (NO), then brake control is performed in a usual manner (as will be described later) at step 5. If it is determined at step S1 that the brake pedal 3 is not operated (YES), then it is determined at step S2 whether a position at which the brake pads 10A and 10B each contact the disk rotor 8 (pad contact position) is already detected. If it is determined at step S2 that the pad contact position is already detected (YES), then the flow proceeds to step S4. If the pad contact position is not yet detected (NO), the pad contact position is detected at step S3, and then the flow proceeds to step S4. A pad clearance control is performed at step S4.

Figure 8:
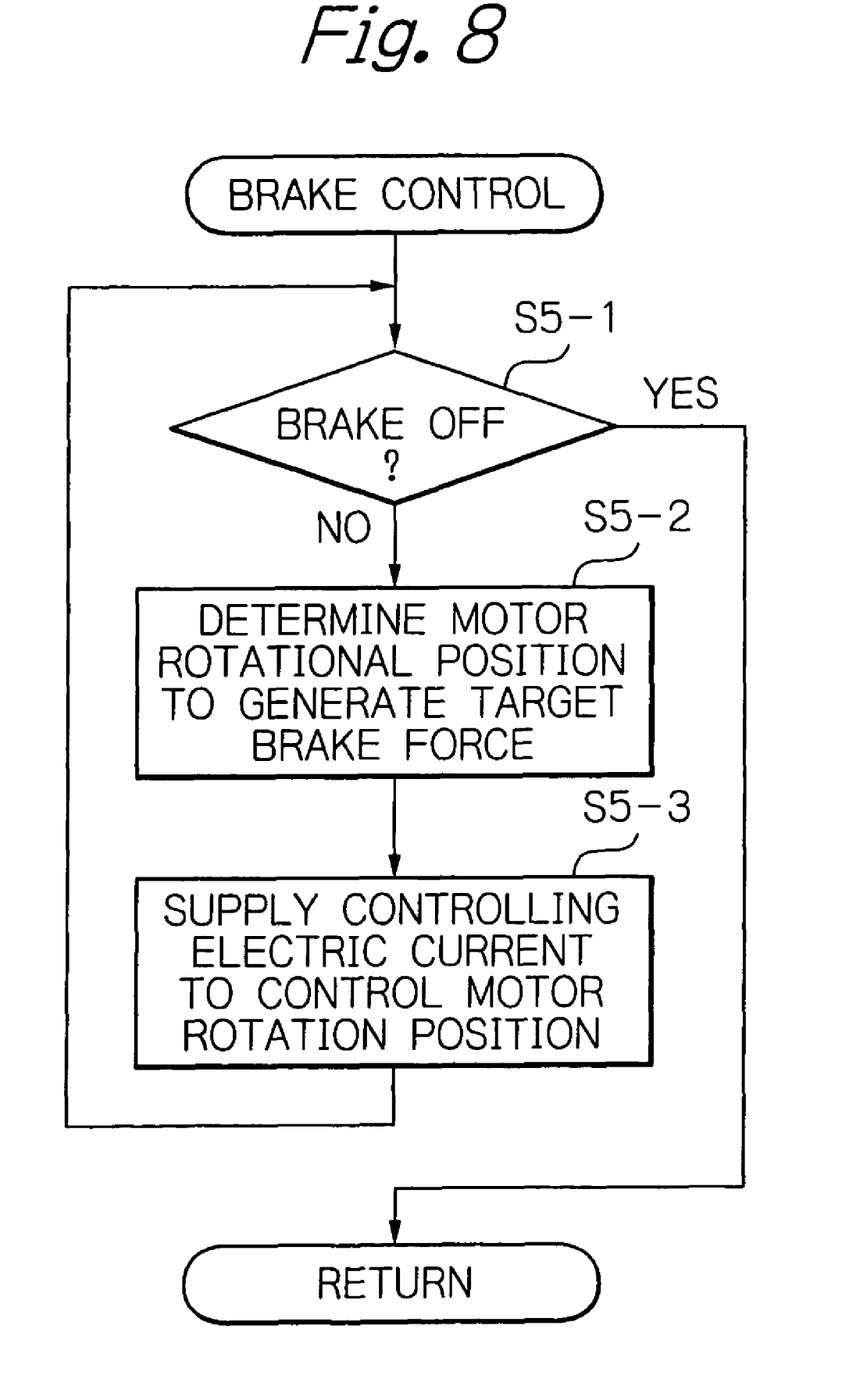
FIG. 8 is a flow chart of a brake control subroutine shown in the flow chart of FIG. 7.

FIG. 8 illustrates a process flow of the usual brake control performed at step S5 in FIG. 7.

Referring to FIG. 8, it is determined at step S5-1 whether the brake pedal 3 is operated. Steps S5-2 and S5-3 are repeated until an operation of the brake pedal 3 is ended. At step S5-2, a target rotational position of the electric motor 23 is set so as to generate a brake force (thrust force of the piston 16) according to a stroke of the brake pedal 3. At step S5-3, a rotational position control is performed by supplying a controlling electric current so that the rotational position of the electric motor 23 matches the target rotational position.

Figure 6:
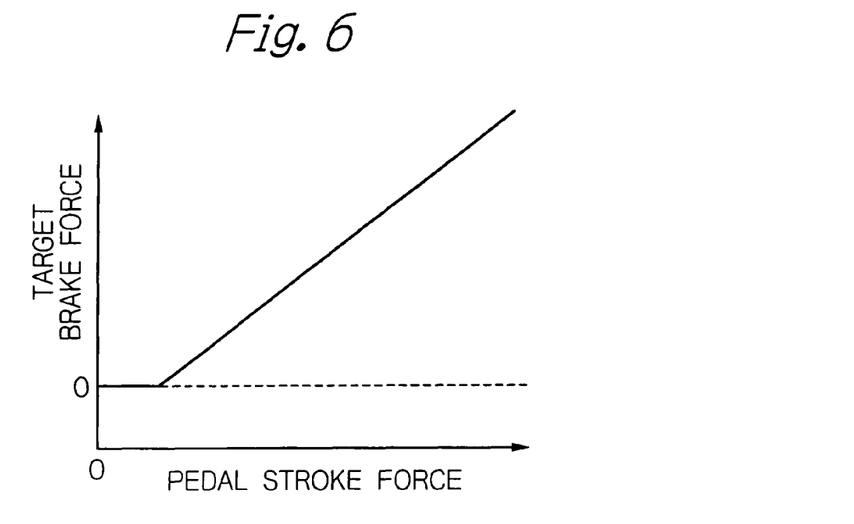
FIG. 6 shows a graph illustrating the relationship between the brake force and the pedal stroke of the electric disk brake shown in FIG. 2.

A relationship between the stroke of the brake pedal 3 and the target brake force at this time is determined based on the preset target brake force/pedal stroke characteristics, for example, as shown in FIG. 6. The relationship between the rotational position of the electric motor 23 and the controlling electric current for generating a target brake force (target thrust force of the piston 16) is preset according to mechanical characteristics of the electric disk brake main body 2. The mechanical characteristics of the electric disk brake main body 2 are determined by specifications of components such as the ball ramp mechanism and the differential speed reducing mechanism, frictions at various portions, rigidity, and other factors.

Mechanical characteristics of the electric disk brake main body 2 will now be described with reference to FIGS. 3 to 5.

Figure 3A:
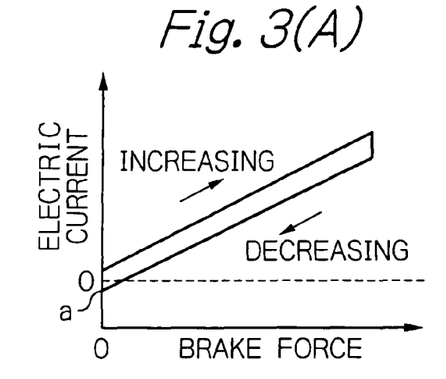
FIG. 3 shows graphs illustrating hysteresis characteristics of an electric disk brake in which mechanical hysteresis is little.
Figure 3B:
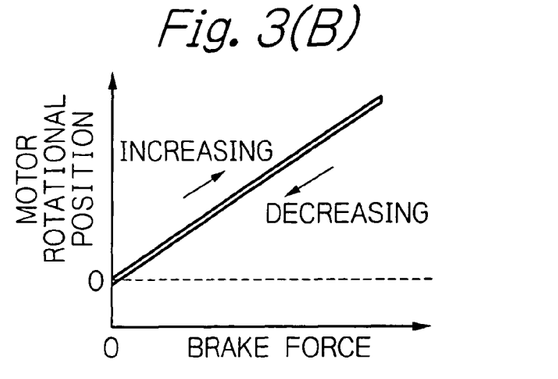

FIG. 3 shows the mechanical characteristics in a case that mechanical efficiency of the components such as the ball ramp mechanism and the differential speed reducing mechanism is good. As shown in FIG. 3(B), the relationship between the rotational position of the electric motor 23 and the brake force at a time of decreasing a brake force is similar to that at a time of increasing a brake force. However, as shown in FIG. 3(A), the relationship between the electric current supplied to the electric motor 23 and the brake force at the time of decreasing the brake force is slightly different from that at the time of increasing the brake force. For a same brake force, an electric current at the time of decreasing the brake force is slightly less than that at the time of increasing the brake force, since a slight hysteresis exists. In this case, since the hysteresis is slight, the brake force reaches approximately zero when a value of electric current is zero at the time of decreasing the brake force.

Figure 4A:
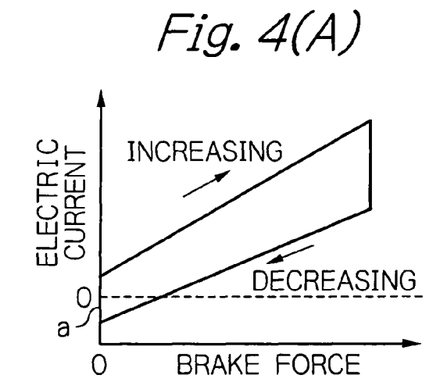
FIG. 4 shows graphs illustrating hysteresis characteristics of an electric disk brake in which mechanical hysteresis is large.
Figure 4B:
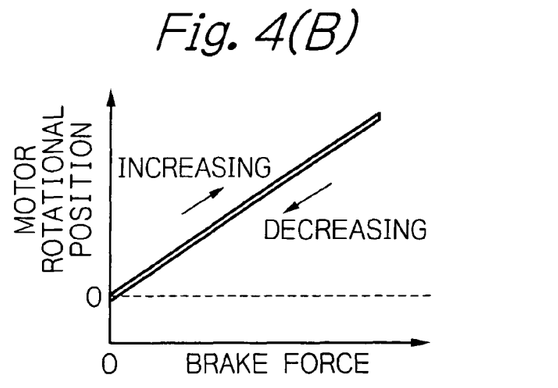

FIG. 4 shows mechanical characteristics in a case that mechanical efficiency of the components such as the ball ramp mechanism and the differential speed reducing mechanism is not so good. As shown in FIG. 4(B), the relationship between the rotational position of the electric motor 23 and the brake force at the time of decreasing the brake force is similar to that at the time of increasing the brake force. However, as shown in FIG. 4(A), the relationship between the electric current supplied to the electric motor 23 and the brake force at the time of decreasing the brake force is different from that at the time of increasing the brake force. For a same brake force, an electric current at the time of the decreasing brake force is less than that at the time of increasing the brake force, since a hysteresis exists. In this case, the brake force does not reach zero when a value of electric current is zero at the time of decreasing brake force. In order to force the brake force to be zero at the time of decreasing the brake force, an electric current should be supplied such that the electric motor 23 is rotated in a reverse direction.

Figure 5A:
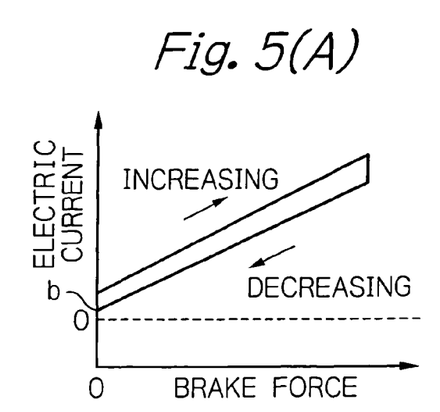
FIG. 5 shows graphs illustrating hysteresis characteristics of an electric disk brake comprising a return spring.
Figure 5B:
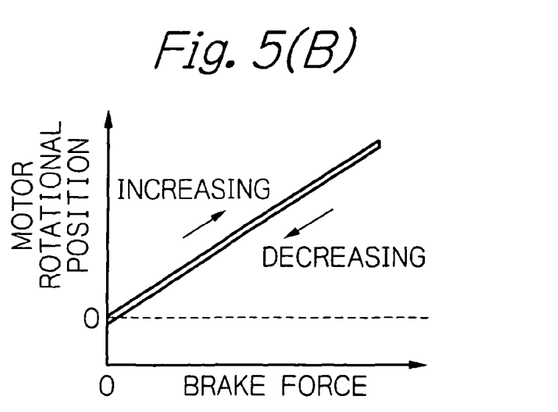

FIG. 5 shows mechanical characteristics in the case that a return spring is disposed at the electric disk brake main body 2 having the mechanical characteristics shown in FIG. 3, so as to constantly urge or bias backward the piston 16. As shown in FIG. 5(B), the relationship between the rotational position of the electric motor 23 and the brake force at the time of decreasing the brake force is similar to that at the time of increasing the brake force, as is the case shown in FIG. 3. In addition, as shown in FIG. 5(A), the relationship between the electric current supplied to the electric motor 23 and the brake force at the time of decreasing the brake force is slightly different from that at the time of increasing the brake force. For a same brake force, an electric current at the time of decreasing the brake force is slightly less than that at the time of increasing the brake force, since a slight hysteresis exists. Since an urging or biasing force of the return spring constantly affects the brake pads 10A and 10B so that the pads are displaced backward, and therefore a larger electric current should be supplied to the electric motor 23 to rotate the electric motor 23 for increasing the brake force against the urging force. The electric current at the time of decreasing the brake force is also larger than that shown in FIG. 3. Therefore, it is certain that a value of the brake force becomes zero when a value of the electric current is zero. However, an electric current larger than zero should be applied in order to secure certain clearances between the brake pads 10A and 10B, and the disk rotor 8.

An exemplary brake operation performed by the above-mentioned usual brake control will now be described with reference to timing diagrams shown in FIG. 11.

Figure 11:
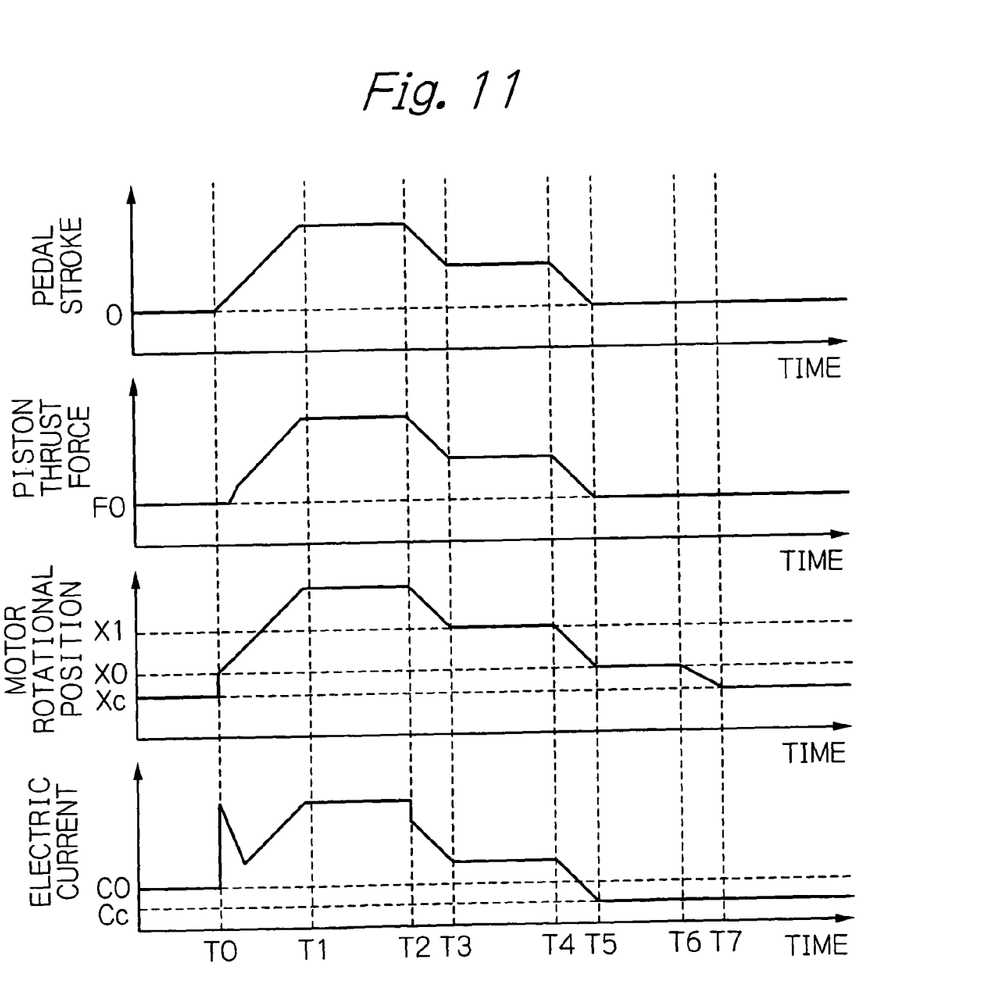
FIG. 11 shows timing diagrams illustrating how the electric disk brake acts when the brake control shown in FIG. 8 is performed.

Referring to FIG. 11, the brake pedal 3 is pressed at time T0. In response to starting to operate the brake pedal 3, a large controlling electric current is applied to quickly increase a brake force. After that, the rotational position of the electric motor 23 is controlled so as to generate a brake force according to the pedal stroke. As the brake stroke becomes constant from time T1, the rotational position of the electric motor 23 is maintained constant. Since this is an operation for increasing the brake force, the brake force can be maintained constant by continuously applying the controlling electric current of time T1.

When the brake pedal 3 is released at time T2, the rotational position of the electric motor 23 is controlled so as to weaken the brake force according to the pedal stroke. Since this is an operation for decreasing brake force, the applied controlling current is reduced by an amount corresponding to a mechanical hysteresis of the electric disk brake main body 2, as described before referring to FIGS. 3 to 5. As the brake stroke becomes constant from time T3, the rotational position of the electric motor 23 is maintained constant. Since this is an operation for decreasing brake force, the applied controlling electric current is increased by an amount corresponding to the mechanical hysteresis of the electric disk brake main body 2 so that the brake force is maintained constant. When the brake pedal is further released at time T4, the rotational position of the electric motor 23 is controlled so as to weaken the brake force according to the pedal stroke.

When the pedal stroke becomes zero at time T5, the rotational position of the electric motor 23 is adjusted to the pad contact position such that the brake pads 10A and 10B contact the disk rotor 8. When a certain time has passed since the pedal stroke became zero, the pad clearance control is performed at time T6. That is, the rotational position of the electric motor 23 is controlled such that certain clearances are secured between the brake pads 10A and 10B, and the disk rotor 8. When certain clearances are achieved at time T7, the electric motor 23 is stopped, and the rotational position at that time is kept.

The pad-contact-position detection performed at step S3 in FIG. 7 will now be described with reference to FIGS. 9 and 12.

Figure 9:
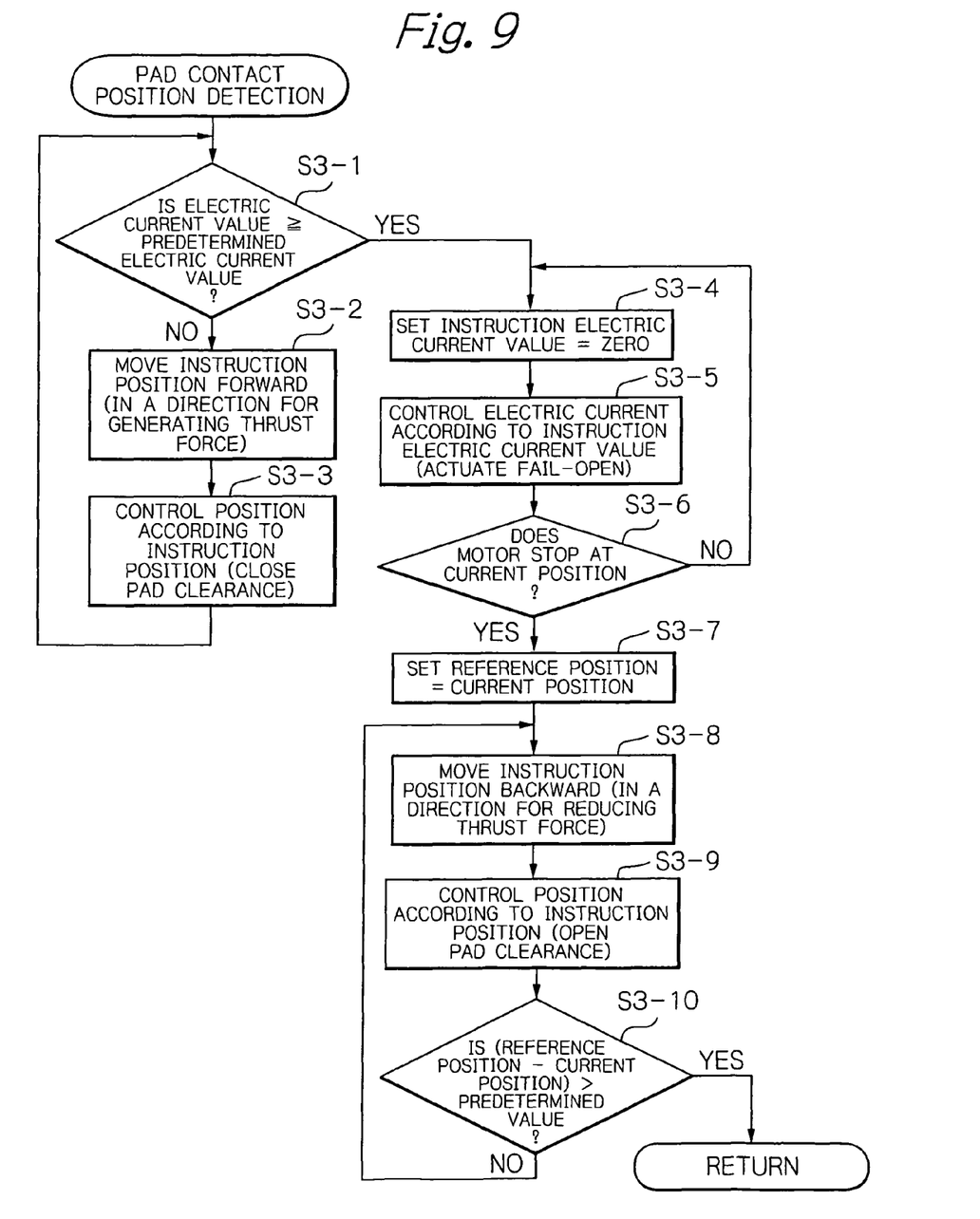
FIG. 9 is a flow chart of a pad-contact-position-detection subroutine shown in the flow chart of FIG. 7.

Referring to FIG. 9, a controlling electric current applied to the electric motor 23 is monitored at step S3-1. Until the controlling electric current reaches a predetermined value, steps S3-2 and S3-3 are repeated so as to advance the brake pads 10A and 10B. Once the controlling electric current applied to the electric motor 23 reaches the predetermined value, the controlling electric current is set to zero at step S3-4, and the electric current application to the electric motor 23 is stopped at step S3-5. Then, the rotational position (stop position) of the electric motor 23 is monitored at step S3-6. When the rotation of the electric motor 23 is stopped, a reference position is set to the current position of the electric motor 23 at step S3-7. Then, steps S3-8 and S3-9 are performed so as to retract the brake pads 10A and 10A by a certain distance, and the position at this time is determined as the pad contact position, while the rotational position of the electric motor 23 is monitored at step S3-10.

Figure 12:
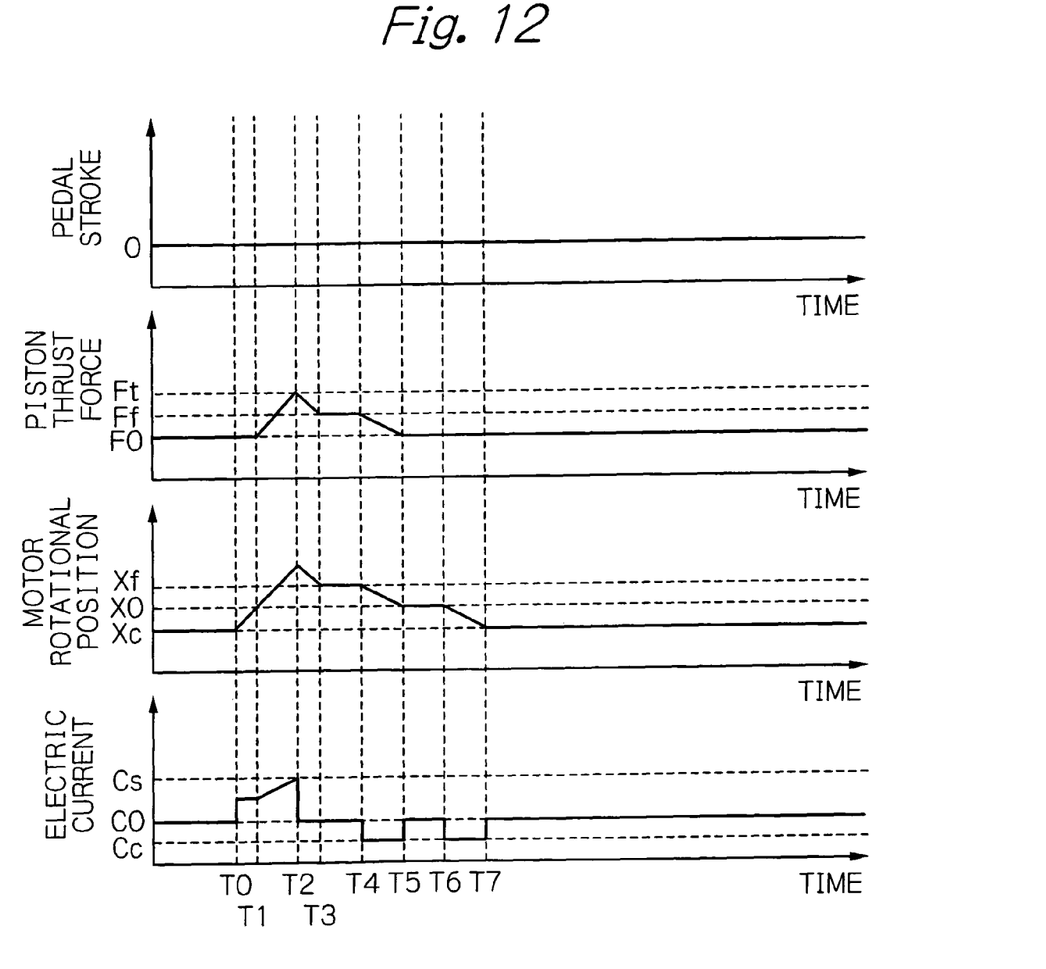
FIG. 12 shows timing diagrams illustrating how the electric disk brake acts when the pad-contact-position-detection shown in FIG. 9 is performed.

FIG. 12 shows timing diagrams illustrating how the electric disk brake acts when the above-described pad-contact-position detection is carried out.

Referring to FIG. 12, an operation for the pad-contact-position detection is started at time T0, and the controlling electric current is supplied to the electric motor 23 so as to advance the brake pads 10A and 10B. Since the brake pads 10A and 10B start to contact the disk rotor 8 at time T1, load to the electric motor 23 (piston thrust force) is increased, and therefore the controlling electric current is increased (it should be noted that it is difficult to directly detect this start of increase in the controlling current). Once the controlling electric current reaches a predetermined electric current CS at time T2, application of the controlling electric current is stopped. Because the controlling electric current application is stopped, the force of the piston pressing the brake pads 10A and 10B is weakened. Therefore, the piston thrust force is decreased from Ft to Ff, and accordingly, the brake pads 10A and 10B is retracted by reactive forces of the brake pads 10A and 10B themselves generated by the contact of the pads to the disk rotor 8. Then, the pads reach respective release positions (fail open) at time T3 (it should be noted that it is difficult to directly detect this). At the release positions, the brake pads 10A and 10B still contact the disk rotor 8, and therefore the piston still holds the piston thrust force Ff. When stop of rotation of the electric motor 23 is detected at time T4, a reference position Xf is set to the position of the electric motor 23 at this time. The electric motor 23 is rotated in a reverse direction by a certain amount by a pad-retracting-control electric current Cc at time T4, and then the electric current application is stopped, whereby the piston thrust force becomes F0. The position at this time is determined as the pad contact position (time T5). If the brake pedal is not operated after that, the electric motor 23 is again rotated at time T6 such that the brake pads 10A and 10B are retracted by a certain amount, thereby obtaining certain pad clearances (time T7).

The pad clearance control will now be described with reference to FIGS. 10 and 13.

Figure 10:
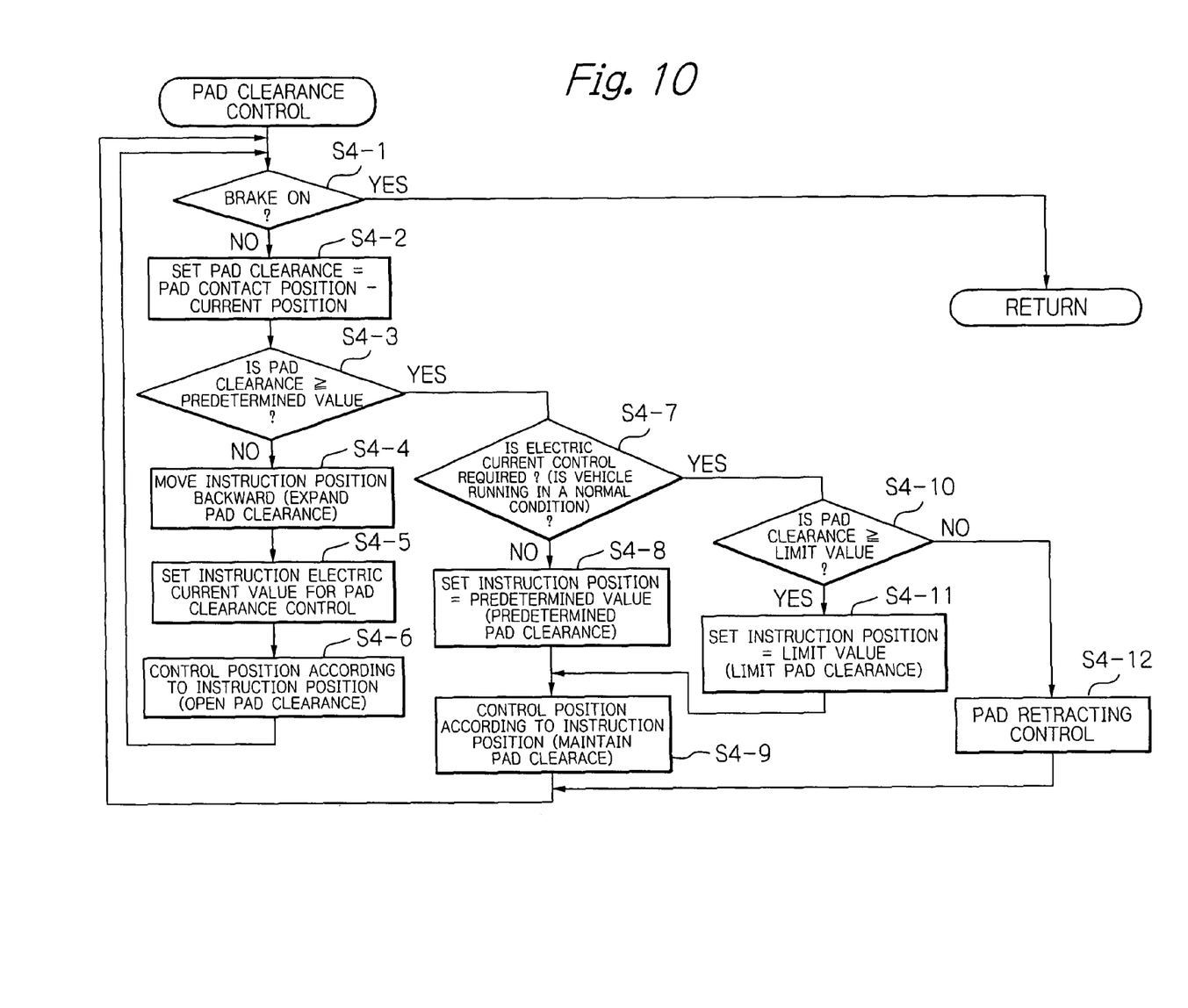
FIG. 10 is a flow chart of a pad-clearance-control subroutine shown in the flow chart of FIG. 7.

Referring to FIG. 10, a brake operation is monitored at step S4-1. If the brake is in operation, the flow returns to the main routine. If the brake is not in operation, then the current pad clearance is calculated at step S4-2. It is determined at step S4-3 whether the current pad clearance reaches a predetermined value. If the current pad clearance does not reach the predetermined value, then steps S4-4, S4-5 and S4-6 are repeated until the pad clearance reaches the predetermined value so that the electric motor 23 is rotated in a reverse direction to retract the brake pads 10A and 10B. By these steps, a predetermined pad clearance can be achieved.

Once the pad clearance reaches the predetermined value, then the flow proceeds to step S4-7. At step S4-7, it is determined whether the pad retracting control is required. If the vehicle, for example, is running on a rough road or is turning to left or right, large acceleration affects the electric disk brake main body 2, and may cause the brake pads 10A, 10B and the piston 16 to be displaced. Therefore, in this case, the pad retracting control is not performed (NO), and at steps S4-8 and S4-9, the controlling electric current is supplied to the electric motor 23 to control the positions of the pads so that the brake pads 10A and 10B each are positioned with a constant distance, i.e., pad clearance (for example, approximately 0.3 mm) from the disk rotor 8.

If the vehicle is running in a normal condition (YES), the flow proceeds to step S4-10. The pad clearance is monitored at step S 4-10, and if the pad clearance reaches a limit value (for example, approximately 0.4 mm) (YES), then a target value of the pad clearance is set to the limit value at step S4-11. At step S4-9, the pad clearance is adjusted to the limit value. By these steps, the pad clearance can be prevented from becoming excessively large.

If the pad clearance does not reach the limit value (NO), then the pad retracting control is performed at step S4-12. The pad retracting control of the brake pads 10A and 10B each having a pad clearance adjusted to a predetermined distance is performed by supplying to the electric motor 23 a pad-retracting-control electric current that is a lowest current for retracting the piston 16 but not sufficient for actually causing retracting of the piston 16. In other words, the pad-retracting-control electric current is small to such an extent that the current position of the piston 16 is maintained. This lowest electric current has a value around an electric current value when a brake force is zero. In the case of the electric disk brake having good mechanical efficiency as shown in FIG. 3(A), the lowest electric current has a value around zero (designated by "a" in FIG. 3(A)). In the case of the electric disk brake having unsatisfactory mechanical efficiency as shown in FIG. 4(A), the lowest electric current has a value around an electric current value (designated by "a" in FIG. 4(A)) for rotating the electric motor 23 in a reverse direction. In the case of the electric disk brake having a return spring for constantly urging or biasing backward the piston 16 as shown in FIG. 5(A), the lowest electric current has a value around an electric current value (designated by "b" in FIG. 5(A)) that enables the rotational position of the electric motor 23 to be maintained against the urging force of the return spring, and at the same time, enables the electric motor 23 to rotate in a reverse direction by the return spring once the piston 16 is pushed backward.

Since the lowest electric current is used as the pad-retracting-control electric current in this way, the piston 16 is maintained in the predetermined position when the brake is not in operation, so as to be displaced by application of an external force and stop at a position at that time upon removal of the external force. Therefore, when runout of the disk rotor 8 occurs and the disk rotor 8 contacts the brake pads 10A and 10B, the piston 16 is pushed backward through the brake pads 10A and 10B. At this time, the contact of the disk rotor 8 to the brake pads 10A and 10B triggers smooth retracting of not only the brake pads 10A and 10B but also the piston which is pressing the brake pad 10B or one of the pad pair. In this way, the brake pads 10A and 10B are usually maintained in respective positions such that they each have the predetermined pad clearance, but when runout occurs due to, for example, thermal deformation caused by a braking operation, and the disk rotor 8 contacts the brake pads 10A and 10B, the contact generates an external force to be applied to the piston 16. The piston 16, which usually restrains retracting of the brake pads 10A and 10B, can be smoothly retracted by receiving the external force, and can be maintained at the retracted position. Consequently, uneven abrasion of the brake pads 10A and 10B is suppressed, and thereby occurrence of brake judder due to uneven abrasion can be prevented.

Figure 13:
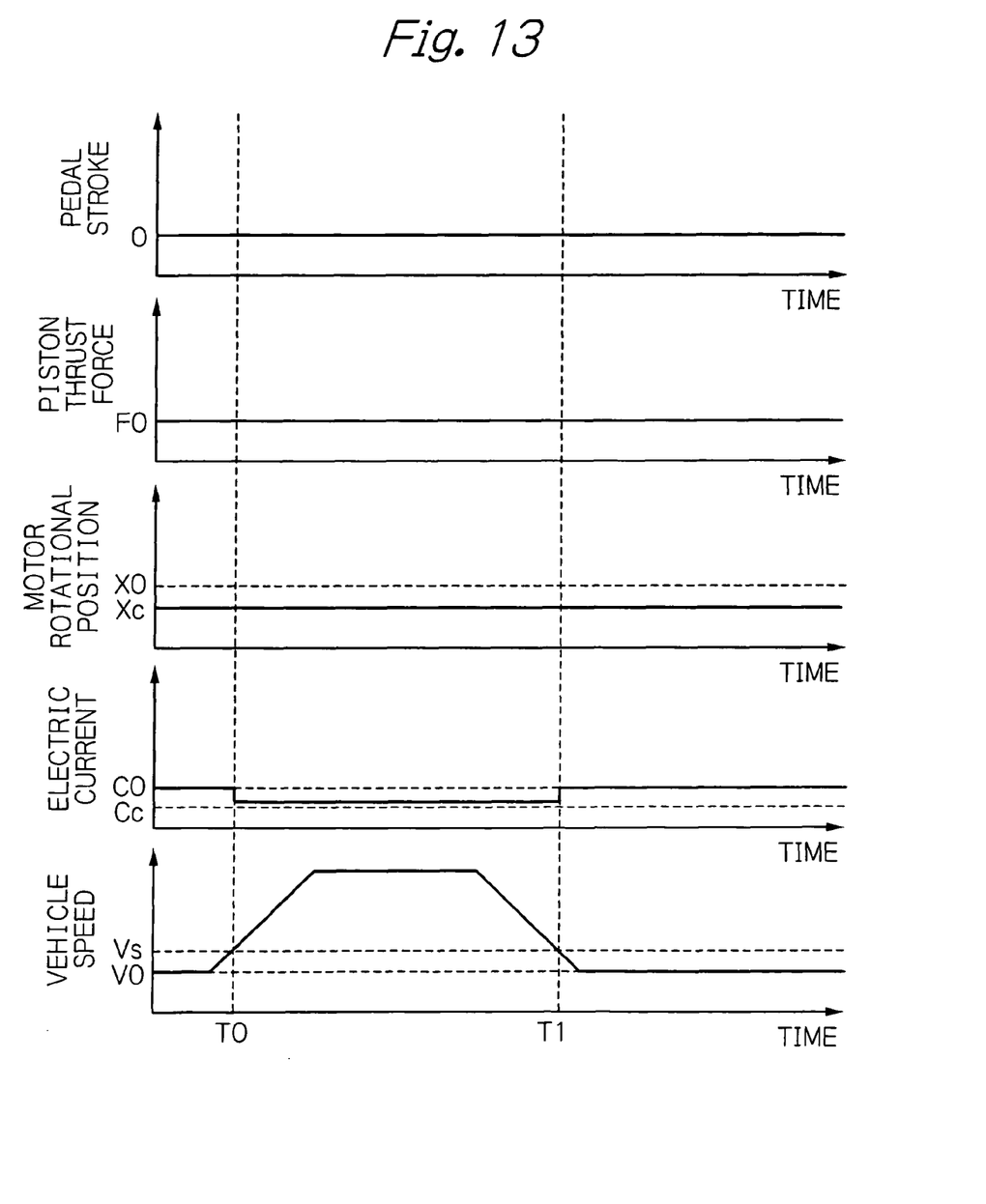
FIG. 13 shows timing diagrams illustrating how the electric disk brake acts when the pad-retracting-control shown in FIG. 10 is performed.

FIG. 13 shows timing diagrams illustrating how the electric disk brake main body 2 acts when the pad retracting control is preformed. In an example shown in FIG. 13, it is determined whether the pad retracting control is required based on vehicle speed; that is, the pad retracting control is not performed until the vehicle speed reaches a reference vehicle Vs, and only when the vehicle runs at a speed equal to or higher than the reference vehicle Vs, the pad retracting control is performed, because runout of the disk rotor 8 due to, for example, thermal deformation caused by a braking operation hardly occurs when the vehicle runs at a lower speed than the reference vehicle speed Vs. In the example shown in FIG. 13, the brake pedal is not operated, and the vehicle speed is changed only by an accelerator pedal.

Referring to FIG. 13, when the vehicle speed reaches the reference vehicle speed Vs at time T0, the pad retracting control is started. A pad-retracting-control electric current Cc is supplied to the electric motor 23 so that the piston 16 becomes ready to be displaced upon receiving an external force while keeping the pad clearance. Therefore, while the supply of the pad-retracting-control electric current Cc continues, the electric motor 23 is merely urged or biased but not actually rotated, and a rotational position Xc of the electric motor 23 is maintained. The piston 16 is also maintained in the position, and therefore the piston 16 does not generates a pressing force and the piston thrust force is maintained at F0. When the vehicle speed is reduced to be less than the reference vehicle speed Vs at time T1, the pad retracting control is ended and the pad-retracting-control electric current Cc is returned to a usual electric current, and the usual pad clearance control (control of the positions of the brake pads 10A and 10B) is performed.

Figure 14:
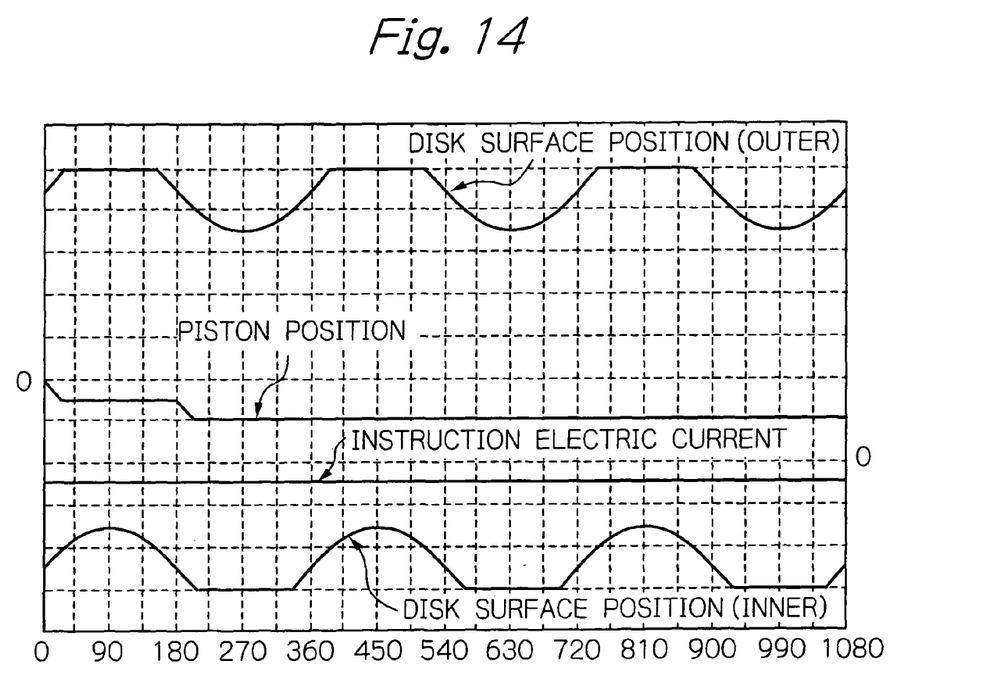
FIG. 14 is a timing diagram illustrating the relationship between the disk surface position of a disk rotor and the position of a piston when the pad-retracting-control shown in FIG. 10 is performed.

As shown in FIG. 14, when the pad retracting control is performed, even through a disk surface position of the disk rotor 8 is displaced due to, for example, runout of the rotating disk rotor 8, and the disk rotor 8 contacts the brake pads 10A and 10B, smooth retracting of the piston 16 is triggered by the contact and the piston 16 is maintained in the retracted position, whereby uneven abrasion of the brake pads 10A and 10B can be prevented.

More specifically, the pad-retracting-control electric current (i.e., instruction electric current in FIG. 14) is supplied to the electric motor 23, whereby the piston 16 is ready to be displaced backward (downward as viewed in FIG. 14). Firstly, due to runout of the disk rotor 8 to its inner side, an inner side surface of the disk rotor 8 contacts the brake pad 10B at 0° to 45°, whereby an external force is applied to the piston 16 from the brake pad 10B, and then the piston 16 is retracted. Next, due to runout of the disk rotor 8 to its outer side, an outer side surface of the disk rotor 8 contacts the brake pad 10A at approximately 180°, whereby an external force is applied to the piston 16 from the brake pad 10A through the caliper main body 11, and then the piston 16 is further retracted. After that, the disk rotor 8 does not contact the brake pads 10A and 10B, and therefore the piston 16 is maintained in the position to which the piston 16 has been retracted.

In the illustrated embodiment, in the pad retracting control, the piston retracted due to contact of the disk rotor 8 is maintained in that position. In some embodiments, displacement of the piston 16 at this time may be monitored, and when retracting of the brake pads 10A and 10B (piston 16) is triggered by contact of the disk rotor 8 due to, for example, runout of the disk rotor 8, the pad-retracting-control electric current may be increased, thereby further retracting the piston 16 by a constant distance from the position to which the piston 16 has been retracted. By such further retracting of the piston, uneven abrasion of the brake pads 10A and 10B can be effectively prevented.

In the illustrated embodiment, a constant electric current is supplied as the pad-retracting-control electric current Cc. In some embodiments, an electric current varying according to a predetermined pattern, or an electric current on which a dither current is superimposed may be used as the pad-retracting-control electric current Cc.

According to the electric disk brake of the above described embodiment, in a case where the brake is not in operation, when the disk rotor contacts the brake pads due to, for example, runout of the disk rotor, the pad pressing member can be easily retracted, whereby it is possible to prevent uneven abrasion of the disk rotor, and therefore prevent brake judder or the like due to uneven abrasion of the disk rotor.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-199537, filed on Jul. 31, 2007.

The entire disclosure of Japanese Patent Application No. 2007-199537 filed on Jul. 31, 2007 including specification, claims, drawings and summary is incorporated herein by reference in its entirety.

What is claimed is:

1. An electric disk brake, comprising:
an electric motor;
a rotation-linear motion converting mechanism for converting a rotational movement of the electric motor into a linear movement;
a pad pressing member for pressing a brake pad against a disk rotor by the linear movement of the rotation-linear motion converting mechanism; and
a controller for, when the brake is in operation, supplying an electric current to the electric motor so as to generate a target thrust force of the pad pressing member,
wherein the pad pressing member, after returning to a predetermined position, is maintained in the position even though the controller stops supplying an electric current to the electric motor; and
when the brake is not in operation, the controller supplies a predetermined pad-retracting-control electric current to the electric motor so that the pad pressing member is urged backward while being maintained in the position, whereby
when the disk rotor contacts the brake pad, retracting of the brake pad is initiated, and
when the disk rotor does not contact the brake pad, the position of the brake pad is maintained.

2. The electric disk brake according to claim 1, wherein the pad-retracting-control electric current is an electric current having an appropriate value to allow the brake pad to be maintained in a position to which the brake pad has retracted, after the brake pad has retracted due to contact of the disk rotor to the brake pad, when the brake is not in operation.

3. The electric disk brake according to claim 1, wherein the controller controls the electric motor such that, when the brake is not in operation, after the pad pressing member has refracted due to contact of the disk rotor to the brake pad, the pad pressing member further refracts by a predetermined distance from a position to which the pad pressing member has refracted.

4. The electric disk brake according to claim 1, wherein the controller stops supply of the pad-retracting-control electric current to the electric motor when a vehicle is turning.

5. The electric disk brake according to claim 1, wherein the controller stops supply of the pad-retracting-control electric current to the electric motor when a vehicle is running on a rough surface.

6. An electric disk brake, comprising:
an electric motor;
a rotation-linear motion converting mechanism for converting a rotational movement of the electric motor into a linear movement;
a pad pressing member for pressing a brake pad against a disk rotor by the linear movement of the rotation-linear motion converting mechanism;
a position detector for detecting a rotational position of the electric motor; and
a controller for supplying an electric current to the electric motor so as to generate a target thrust force of the pad pressing member,
the controller, when the brake is not in operation, returning the pad pressing member to a predetermined position and maintaining the pad pressing member in the position, and supplying to the electric motor a pad-retracting-control electric current that is a lowest electric current allowing the pad pressing member to be maintained in the predetermined position.

7. The electric disk brake according to claim 6, wherein the pad pressing member is constantly urged backward by a urging unit.

8. The electric disk brake according to claim 6, wherein, when the brake is not in operation, the controller, after returning the pad pressing member to the predetermined position based on a detection result of the position detector, supplies the pad-retracting-control electric current to the electric motor so that the pad pressing member is maintained in the predetermined position.

9. The electric disk brake according to claim 8, wherein the pad pressing member is constantly urged backward by a urging unit.

10. The electric disk brake according to claim 8, wherein, the controller controls the electric motor such that, when the brake is not in operation, after the pad pressing member has refracted due to contact of the disk rotor to the brake pad, the pad pressing member further refracts by a predetermined distance from a position to which the pad pressing member has refracted.

11. The electric disk brake according to claim 10, wherein the pad pressing member is constantly urged backward by a urging unit.

12. The electric disk brake according to claim 6, wherein the controller stops supply of the pad-retracting-control electric current to the electric motor when a vehicle is turning.

13. The electric disk brake according to claim 6, wherein the controller stops supply of the pad-retracting-control electric current to the electric motor when a vehicle is running on a rough surface.

* * * * *